(12) United States Patent
Kern et al.

(10) Patent No.: US 6,393,537 B1
(45) Date of Patent: May 21, 2002

(54) HOST STORAGE MANAGEMENT CONTROL OF OUTBOARD DATA MOVEMENT

(75) Inventors: Robert Frederic Kern; Ronald Maynard Kern; William Frank Micka; Mark Anthony Sovik, all of Tucson, AZ (US)

(73) Assignee: International Business Machines Corporation

( * ) Notice: Subject to any disclaimer, the term of this patent is extended or adjusted under 35 U.S.C. 154(b) by 0 days.

(21) Appl. No.: 09/003,544

(22) Filed: Jan. 6, 1998

(51) Int. Cl.[7] .................. G06F 12/00; G06F 3/00; G06F 13/00
(52) U.S. Cl. ................ 711/162; 711/112; 710/38
(58) Field of Search ................ 711/162, 161, 711/112, 111, 113, 114; 710/38

(56) References Cited

U.S. PATENT DOCUMENTS

| | | | |
|---|---|---|---|
| 4,755,928 A | * 7/1988 | Johnson et al. | 364/200 |
| 4,833,679 A | 5/1989 | Anderson et al. | |
| 4,837,675 A | * 6/1989 | Bean et al. | 364/200 |
| 4,972,368 A | 11/1990 | O'Brien et al. | |
| 5,210,865 A | * 5/1993 | Davis et al. | 395/575 |
| 5,210,866 A | 5/1993 | Milligan et al. | |
| 5,226,157 A | * 7/1993 | Nakano et al. | 395/600 |
| 5,263,154 A | 11/1993 | Eastridge et al. | |
| 5,278,860 A | 1/1994 | Fortier et al. | |
| 5,375,232 A | 12/1994 | Legvold et al. | |
| 5,379,398 A | 1/1995 | Cohn et al. | |
| 5,388,243 A | * 2/1995 | Glider et al. | 395/425 |
| 5,454,099 A | 9/1995 | Myers et al. | |
| 5,455,946 A | 10/1995 | Mohan et al. | |
| 5,457,796 A | 10/1995 | Thompson | |
| 5,497,483 A | 3/1996 | Beardsley et al. | |
| 5,535,381 A | 7/1996 | Kopper | |
| 5,559,991 A | 9/1996 | Kanfi | |
| 5,574,906 A | 11/1996 | Morris | |
| 5,574,950 A | * 11/1996 | Hathorn | 395/861 |
| 5,595,707 A | * 1/1997 | Ohta | 395/182.04 |
| 5,634,052 A | 5/1997 | Morris | |
| 5,689,728 A | * 11/1997 | Sugimoto et al. | 395/858 |
| 5,809,543 A | * 9/1998 | Byers et al. | 711/162 |
| 5,898,891 A | * 4/1999 | Meyer | 395/853 |
| 5,953,513 A | * 9/1999 | Saika et al. | 395/500 |
| 6,145,028 A | * 1/2000 | Shank et al. | 710/31 |
| 6,092,216 A | * 7/2000 | Kobayashi et al. | 714/9 |

OTHER PUBLICATIONS

IBM Corporation, IBM TDB 09/81 p1947, Sep. 1981, Overlapping Data Streaming and Concurrent Read Write References Within a Storage Subsystem.

* cited by examiner

*Primary Examiner*—Do Hyun Yoo
*Assistant Examiner*—Kimberly McLean
(74) *Attorney, Agent, or Firm*—David W. Victor; Konrad Raynes Victor & Mann

(57) ABSTRACT

A storage-and-host-controller-managed outboard data management tool is described wherein the host controller defines logical paths between various storage controllers and data storage devices, and the storage controller manages the movement of data to and from the various data storage devices while only sending data to the host processorg if necessary.

14 Claims, 2 Drawing Sheets

HOST STORAGE MANAGEMENT CONTROL OF OUTBOARD DATA MOVEMENT

CROSS-REFERENCE TO RELATED APPLICATIONS

This application is related to application Ser. No. 09/003,532 entitled "HOST STORAGE MANAGEMENT CONTROL OF OUTBOARD DATA MOVEMENT USING PUSH-PULL OPERATIONS," filed same date herewith, by Robert F. Kern et al., which application is incorporated by reference herein.

BACKGROUND OF THE INVENTION

1. Field of the Invention

This invention relates in general to improvements in the field of computer systems having backup/restore or archive/retrieve subsystems, and more particularly, to host storage management of Outboard Data Movement (ODM).

2. Description of Related Art

Data processing systems are required to store large amounts of data. As data processing systems become more complex, the management, control, and movement of the data required by the system, becomes a larger task for the processor.

Typically, the host processor of a system controls and manages the data through paths that travel through the host processor. This process involves the management of data, as well as requiring the Central Processing Unit (CPU) of the system to spend a significant portion of time manipulating data when the CPU could be performing other tasks.

Further, many systems contain multiple data storage subsystems, e.g., backup/restore subsystems that are typically used to save a recent copy or version of a file or portion thereof on some form of backup data storage device, such as magnetic or optical disk drives, tape drives, or other memory, multiple Direct Access Storage Devices (DASDs) for storage of large amounts of data, etc. The constant management of multiple storage devices is a further drain on CPU processing time. Those engaged in the field of data processing and especially in the field of data storage subsystems are continuously striving to find improved methods and systems to reduce the demands of backup/restore subsystems. Further, present systems are reaching their scalability limits and can no longer use parallel processing to manage the amounts of data required in the time allotted for these tasks.

However, some host processor involvement is still needed to maintain several qualities of the data, e.g., the "current" copy of the data, data security, the data format, and the consistency of the data for a given application.

It can be seen, then that there is a need for a method of managing data that reduces host processor involvement. It can also be seen, then, that there is a need for a method of managing data that allows the data to be controlled in a more efficient manner. It can also be seen, then, that there is a need for a method of managing data that retains host processor involvement for certain data qualities.

SUMMARY OF THE INVENTION

To overcome the limitations in the prior art described above, and to overcome other limitations that will become apparent upon reading and understanding the present specification, the present invention discloses a method and apparatus that permits the primary storage subsystem to perform an Outboard Data Movement (ODM) function to (target) or from (source) where the primary storage subsystem is the source or target of the ODM operation.

An object of the present invention is to provide for data management with minimal host processor interaction. Another object is to provide for more efficient management and control of data. A further object is to provide more reliable data management methods.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
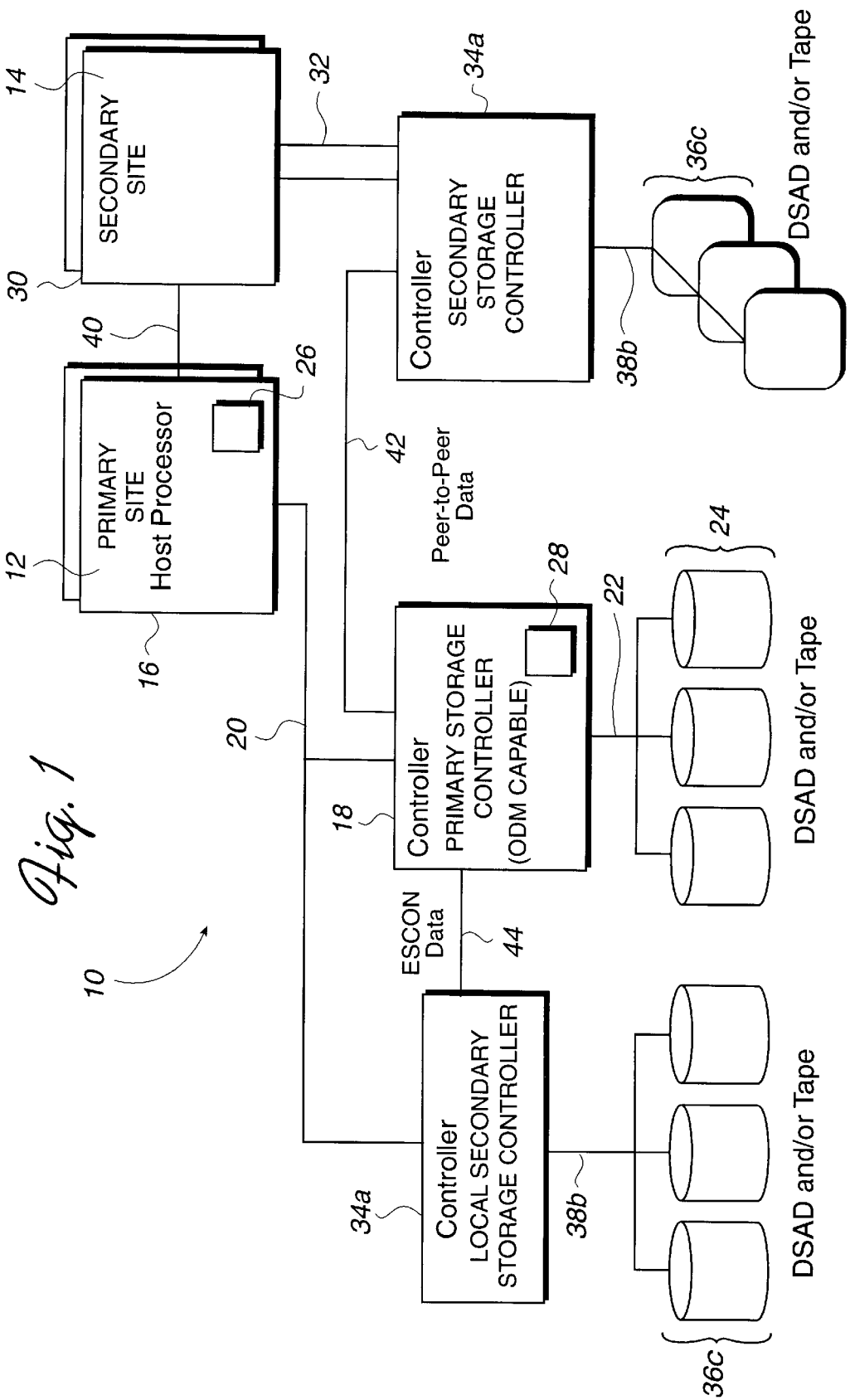
FIG. 1 is an exemplary hardware environment used to implement the preferred embodiment of the invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Background

As data storage systems grow in size and complexity, the most cost effective way to process data is to process it as close to the source of the data as possible. The trend with dispersed computing systems is to consolidate the compute servers and the data.

Computer system users and owners are looking for ways to reduce the cost and the skills complexity of the management tasks required to manage their computer environments and, especially, the storage environment. Reducing complexity from a storage point of view includes several factors, e.g., standardization of storage management tools and interfaces, centralized storage management of data, centralized security, stability of the storage medium, and exploitation of new storage technologies that are transparent to both applications and end users.

The current focus of computer users and system administrators is to address the needs of the underlying customer business as it relates to information. One industry trend is to "outsource" to a facilities management corporation all data management and focus only on utilizing the services to address the needs of the business. Many corporations are unable to do this for cost and convenience reasons.

Further, the complexity of present computer systems makes it difficult to determine or understand where the most current copy of a given piece of data is. Because data is shared between many different users and systems, the consistency of the data is difficult to manage. Although database management tools have helped in this regard, the applications and database systems do not help locate the "real" copy of the most current data.

Using DB2 as an example, data set information is kept in the system catalog or "file directory". The system or master catalog may be broken up into several user catalogs which may point to additional user catalogs and eventually directly to the storage device on which the data is stored. However, this location is where the data that is not being used is stored, not the data that is being used. At any point in time, the current data may be anyplace in a hierarchy of locations, e.g., main storage (real, virtual, private, etc.), expanded storage, coupling facilities, or cache memories.

Once the current data is located, some applications require that the data be kept in a static or "locked" state for a given period of time. Application programs determine when something needs to be locked, the scope of the lock, the type of lock required, and the timeframe the lock "should" be held. Of course, application logic can fail, so between the operating system and various application functional recovery routines deadlocks conditions and held locks must be released resulting in the freeing up of the held resource(s). There may also be a complication of various hierarchy of locks which must be acquired and then released in a specific order.

Multi-system sharing further complicates the locking process as now the data must now be managed across multiple systems with the minimal "inter-system" communications overhead. The penalty for any undetected slip up in this process is corrupted data.

OS/390 provides the leading edge hardware/software data sharing platform for high performance transactional applications. An optimized balance between all components with application transparency is provided via several OS/390 Data Base models (e.g., IMS, DB2, and the VSAM access method).

Outboarding Storage Management (OSM)

From the above discussion, keeping the application and the associated data together, as well as managing both the application and the data together, is beneficial for a number of reasons. However, there are some aspects of storage management that should be done outboard. In most cases the compute platform that owns the application needs to be involved and actually direct these outboarded activities to maintain data consistency and cost effectively manage the entire process. Data that may be effectively outboarded include third party transfers (where the host is minimally involved), data serving or sharing, and remote copying of data (e.g., snapshot copies, data migration, etc.).

Implementation

In the present invention, the host processor to storage controller interface is programmed to identify paths and volumes on other storage controllers. This allows the storage controller to "read data" from a source and "write data" to a target device that is physically attached to another storage controller.

Using the additional programming provided by the present invention allows ODM functions to operate with storage controllers without outboard data movement functions as part of their programming. This expands the hardware available for interconnection, and expands the interconnectivity between systems for data sharing and data management.

The ODM function, when used in this storage management concept, is executed/performed under the direction/control of an exploiting host based application. The exploiting application is responsible for the allocation/serialization of the source object and the allocation of the target object prior to the data movement operation request. The data movement operation is an extent copy operation.

A typical data processing system may take the form of a host processor, such as an IBM System/360 or IBM System/370 processor for computing and manipulating data, and running, for example, data facility storage management subsystem/multiple virtual systems (DFSMS/MVS) software, having at least one IBM 3990 storage controller attached thereto, the storage controller comprising a memory controller and one or more cache memory types incorporated therein. The storage controller is further connected to a group of direct access storage devices (DASDs) such as IBM 3380 or 3390 DASDs. While the host processor provides substantial computing power, the storage controller provides the necessary functions to efficiently transfer, stage/destage, convert and generally access large databases.

Hardware Environment

FIG. 1 is an exemplary hardware environment used to implement the preferred embodiment of the invention.

FIG. 1 shows a data management system 10 having a primary site 12 and a secondary site 14, wherein the secondary site 14 can be located remotely from the primary site 12. The primary site 12 includes a host processor or primary processor 16. The primary processor 16 could be, for example, an IBM Enterprise Systems/9000 (ES/9000) processor running DFSMS/MVS operating software and further may have several application programs running thereon. A primary storage controller 18, for example, an IBM 3990 Model 6 storage controller, is connected to the primary processor 16 via a channel 20. The primary storage controller 18 is coupled via an I/O channel 22 to one or more data storage devices 24.

As is known in the art, several such primary storage controllers 18 can be connected to the primary processor 16, or alternately, several primary processors 16 can be attached to the primary storage controllers 18. Several primary DASDs 24 can be connected to the primary storage controller 18.

In the preferred embodiment, the data storage device 24 comprises a direct access storage device (DASD) such as a magnetic or optical disk drive, but can also comprise a sequential access storage device (SASD) such as a tape drive. of course, those skilled in the art will recognize that any data storage device may be used with the present invention.

The primary storage controller 18 and attached primary data storage device 24 form a primary substorage system. Further, the primary storage controller 18 and the primary data storage device 24 could be single integral units.

The host processor 16 executes a computer program 26 that controls the operation of the host processor 16 and its interaction with the storage controller 18. In the preferred embodiment, the computer program 26 comprises a backup/restore utility or database management system, although other computer programs may be used as well.

Similarly, the storage controller 18 executes a computer program 28 that controls the operation of the storage controller 18 and its interactions with the host processor 16 and data storage device 24. In the preferred embodiment, the computer program 28 provides backup/restore logic, although other functions may be provided as well.

The secondary site 14 includes a secondary processor 30, for example, an IBM ES/9000, which is connected via a channel 32 to a secondary storage controller 34, e.g., an IBM 3990 Model 6. A data storage device 36 is further connected to the secondary storage controller 34 via an I/O channel 38. The primary processor 16 is connected to the secondary processor 30 by at least one host-to-host communication link 40, for example, channel links or telephone T1/T3 line links, etc. The primary processor 16 may have indirect connectivity with the secondary storage controller 34 by, for example, primary controller 18 and peer-to-peer connection 42. The primary storage controller 18 communicates with the secondary storage controller 34 via links 44. The links 42 and 44 can be ESCON links or other peer-to-peer links between primary storage controller 18 and secondary storage controller 34. Further, there can be one or more links 42 and 44 between the primary storage controller 18 and the secondary storage controller 34.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Those skilled in the art will also recognize that the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Host Computer Operations

The computer program 26 executed by the host processor 16 generally provides the control functions for the data management operations performed by the storage controller 18. The computer program 26 accepts and processes the requests for the backup/restore, movement, and management of data table spaces, files, groups of files, or entire file systems on the data storage devices 24 and 36, as single or multiple units.

Storage Controller Operations

The computer program 28 executed by the storage controller 18 provides backup/restore support by performing functions in real-time, thereby alleviating the overhead of performing these tasks upon command in the host processor 16. This separation of the backup/restore operations from the host processor 16 allows the storage controller 18 to keep track of those areas of the data storage device 24 that require backup, and provide the backup/restore operations incrementally as an independent process or upon command from the host processor 16.

The computer program 28 interacts with host processor 16 when the host processor 16 needs the data stored on data storage devices 24 and 36 for manipulation or reporting purposes. Further, computer program 28 receives instructions from computer program 26 for the definition of paths and volumes to data storage devices 24 and 36 and translates the location of the specified data from a logical name (file specification) to a physical identifier (logical unit number, physical address, offset, size, etc.). Further, the computer program 26 communicates this information to the storage controller 18.

In the present invention, the primary processor 16 directs the primary storage controller 18 to set up paths to and from the multiple data storage devices 24 and 36 volumes, through the primary storage controller 18, through the secondary storage controller 34, and to and from the data storage devices 24 and 36. Once these paths and volumes are defined by the primary processor 16, the primary storage controller 18 can manage the movement, copying, and flow of data from data storage device 24 to data storage device 34 and vice versa.

This frees up primary processor 16 to perform other tasks while the primary storage controller 18 is communicating with secondary storage controller 34, primary data storage device 24 and secondary data storage device 36 to manage the data. Instead of primary processor 16 using channel 20 and link 40 to direct the flow of data from data storage device 24 and data storage device 36 directly, these functions are passed down to primary storage controller 18 to perform the same operations. Primary processor 16 only receives the data from data storage device 24 and data storage device 36 when primary processor 16 needs to use or manipulate the data, e.g., by performing arithmetic or change functions to the data. Otherwise, the CPU time of primary processor 16 that would be spent managing the data is free to perform other functions without interruptions for data management tasks.

Outboard data movement operations may be performed by the storage controller 18 using "point in time copy" techniques, "snapshot" techniques, or by simple copy commands that rely on the host processor 16 to not perform write operations, or to manage the implications of write operations during the backup process. However, if the storage controller 18 does not have the capability to do "snapshot" or other techniques, the end user can perform these techniques elsewhere in the system 10.

Thus, according to the present invention, the storage controller 18 performs the data management operations of a storage subsystem substantially independently of the host processor 16, although such operations may be initiated or managed by the computer program 26. As a result of this storage-controller-managed outboard data movement, the storage controller 18 and the computer program 28 relieve the host processor 16 and the computer program 26 of most of the functions associated with backup/restore operations.

Flowchart

Figure 2:
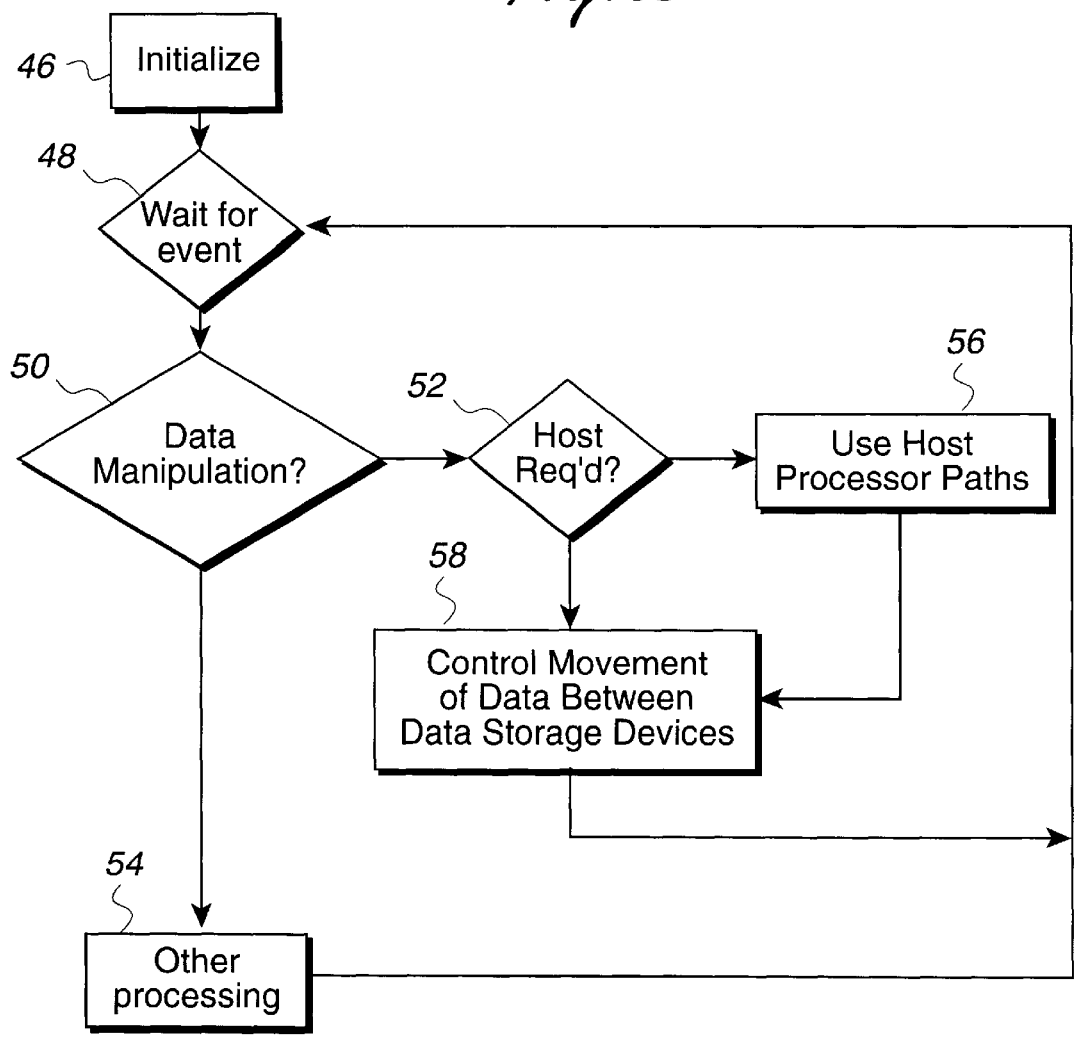
FIG. 2 is a flowchart illustrating the logic performed by the present invention.

FIG. 2 is a flowchart illustrating the logic performed by the present invention.

Block 46 represents the initialization of the storage controller 18. Generally, this step includes loading the computer program 28, and defining the paths and volumes of the data storage devices 24 and 36. These definitions typically include establishing addresses for data storage devices 24 and 36, wherein the path is established by the primary processor 16 and the established path does not travel through the host computer.

Block 48 is a decision block that represents the storage controller 18 waiting for the next event to occur. Block 50 represents a controller event occuring. Thereafter, control transfers to Blocks 52–62.

Block 52 is a decision block that determines whether the event is an outboard data move request for the controller 18 to execute. Such manipulation events include, e.g., write operations to the data storage devices 24 and 36, copy operations, display operations, etc. If so, control transfers to Block 54; otherwise, control transfers to Block 56.

Block 54 represents the storage controller 18 initializing the paths 42 and 44 between the source and target controllers.

Block 56 represents the storage controller 18 performing a normal data manipulation within the DASD 24.

Block 58 represents the storage controller 18 communicating the extent ranges to copy the data between the primary and secondary controllers.

Block 60 is a decision block that represents the controller 18 determining if the copy of the extents is complete. If so, control passes to block 62, and control is returned to the host processor 16. If not, control passes to block 64, and the copy of extents continues until completed.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for transferring data between a first and second storage devices, comprising:

processing a data transfer request with a host system to transfer data from the first storage device to the second storage device;

allocating, with the host system, source and target locations, wherein data is transferred from the source location in the first storage device to the target location in the second storage device;

maintaining, with the host system, serialization of the source location;

defining, with the host system, a data transfer request to include information on the source and target locations and data sets to transfer therebetween;

defining with the host system data movement paths from the first storage device to a first controller, from the first controller to a second controller, and from the second controller to the second storage device.

communicating, with the host system, the data transfer request, including the information on the data sets to transfer and the data movement paths to the first controller;

processing, with the first controller, the information on the data sets to transfer; and transferring, with the first controller, the data sets from the source location in the first storage device to the second controller, wherein the second controller transfers the data sets to the target location in the second storage device, and wherein the data movement paths between the first and second controllers through which the data sets are transferred do not pass through the host system.

2. The method of claim 1, wherein the data transfer request comprises a data transfer operation that is a member of the set of data transfer operations comprising a snapshot copy, point in time copy, backup, restore, and copy.

3. The method of claim 1, wherein transferring the data sets with the first controller comprises the first controller initiating a transfer process to transfer the data sets, wherein the transfer process executed by the first controller is independent of processes executed by the host system.

4. The computer useable medium of claim 3, wherein the first controller initiates a transfer process to process the data transfer request data structure and transfer the data sets from the first storage device to the second storage device, wherein the transfer process executed by the controller is independent of processes executed by the host system.

5. A method for transferring data between a first and second storage devices, comprising:

processing a data transfer request with a host system to transfer data from the first storage device to the second storage device;

allocating, with the host system, source and target locations, wherein data is transferred from the source location in the first storage device to the target location in the second storage device;

maintaining, with the host system, serialization of the source location;

defining, with the host system, a data transfer request to include information on the source and target locations and data sets to transfer therebetween, wherein the data transfer request defined by the host system includes an extent data structure of storage areas in the first storage device to backup in storage areas in the second storage device, wherein the step of processing comprises a first controller sequentially processing the data sets indicated in the extent, and wherein the step of transferring the data sets comprises the first controller sequentially transferring data sets from the first set of storage areas in the first storage device to a second controller to backup the data from the first storage device in the second storage device;

defining with the host system data movement paths from the first storage device to the first controller, from the first controller to the second controller, and from the second controller to the second storage device;

communicating, with the host system, the data transfer request, including the information on the data sets to transfer and the data movement paths to the first controller;

processing, with the first controller, the information on the data sets to transfer; and transferring, with the first controller, the data sets from the source location in the first storage device to the second controller, wherein the second controller transfers the data sets to the target location in the second storage device, and wherein the data movement paths between the first and second controllers through which the data sets are transferred do not pass through the host system.

6. A system for transferring data, comprising:

a host system;

first and second controllers;

a communication line providing data communication between the host system and the first controller;

a first storage device;

a second storage device, wherein the first and second controllers are in data communication with the first and second storage devices;

means, performed by the host system, for allocating source and target locations, wherein data is transferred from the source location in the first storage device to a target location in the second storage device;

means, performed by the host system, for maintaining serialization of the source location;

means, performed by the host system, for defining data movement paths from the first storage device to the first controller, from the first controller to the second controller, and from the second controller to the second storage device;

means, performed by the host system, for defining a data transfer request to include information on the data movement paths, source and target locations, and data sets to transfer therebetween;

means, performed by the communication line, for transferring the data transfer request, including the information on the data sets to transfer to the first controller;

means, performed by the first controller, for processing the information on the data sets to transfer; and means, performed by the first controller, for transferring the data sets from the source location in the first storage device to a second controller, wherein the second controller transfers the data sets to the target location in the second storage device, wherein the data movement paths between the first and second controllers through which the data sets are transferred do not pass through the host system.

7. The system of claim 6, further including means, performed by the first controller, for initiating a transfer process to control the transfer of the data sets from the first storage device to the second storage device, wherein the transfer process executed by the first controller is independent of processes executed by the host system.

8. An article of manufacture for use in programming a host system and first and second controllers to transfer data between a first storage device and a second storage device, the article of manufacture comprising at least one computer useable medium each including at least one computer program embedded therein for causing the host system and first and second controllers to perform:

processing, with the host system, a data transfer request to transfer data from the first storage device to the second storage device;

allocating, with the host system, source and target locations, wherein data is transferred from a source location in the first storage device to a target location in the second storage device;

maintaining, with the host system, serialization of the source location;

defining with the host system data movement paths from the first storage device to the first controller, from the first controller to the second controller, and from the second controller to the second storage device;

defining, with the host system, a data transfer request to include information on the data movement paths, source and target locations and data sets to transfer therebetween;

communicating, with the host system, the data transfer request, including the information on the data sets to transfer to the first controller;

processing, with the first controller, the information on the data sets to transfer; and transferring, with the first controller, the data sets from the source location in the first storage device to the second controller, wherein the second controller transfers the data sets to the target location in the second storage device, wherein the data movement paths between the first and second controllers through which the data sets are transferred do not pass through the host system.

9. The article of manufacture of claim 8, wherein the data transfer request comprises a data transfer operation that is a member of the set of data transfer operations comprising a snapshot copy, point in time copy, backup, restore, and copy.

10. The article of manufacture of claim 8, wherein transferring the data sets with the first controller comprises the first controller initiating a transfer process to transfer the data sets, wherein the transfer process executed by the first controller is independent of processes executed by the host system.

11. An article of manufacture for use in programming a host system and first and second controllers to transfer data between a first storage device and a second storage device, the article of manufacture comprising at least one computer useable medium each including at least one computer program embedded therein for causing the host system and first and second controllers to perform:

processing, with the host system, a data transfer request to transfer data from the first storage device to the second storage device;

allocating, with the host system, source and target locations, wherein data is transferred from a source location in the first storage device to a target location in the second storage device;

maintaining, with the host system, serialization of the source location;

defining with the host system the data movement paths from the first storage device to the first controller, from the first controller to the second controller, and from the second controller to the second storage device;

defining, with the host system, a data transfer request to include information on data movement paths, source and target locations and data sets to transfer therebetween, wherein the data transfer request defined by the host system includes an extent data structure of storage areas in the first storage device to backup in storage areas in the second storage device, wherein the step of processing comprises the first controller sequentially processing the data sets indicated in the extent, and wherein the step of transferring the data sets comprises the first controller sequentially transferring data sets from the storage areas in the first storage device to the second controller to backup the data in the second storage device;

communicating, with the host system, the data transfer request, including the information on the data sets to transfer to the first controller;

processing, with the first controller, the information on the data sets to transfer; and transferring, with the first controller, the data sets from the source location in the first storage device to the second controller, wherein the second controller transfers the data sets to the target location in the second storage device, wherein the data movement paths between the first and second controllers through which the data sets are transferred do not pass through the host system.

12. A computer useable medium for storing data for access by a first controller, including a data transfer request data structure comprising information on data movement paths from a first storage device to the first controller, from the first controller to a second controller and from the second controller to a second storage device and information indicating data sets to transfer, wherein a host system generates the data transfer request data structure and defines the data movement paths to not pass through the host system, wherein the host system communicates the data transfer request data structure to the first controller, wherein the first controller processes the data transfer request data structure to control the transfer of data sets from the first storage device via the data movement paths indicated in the data transfer request data structure to the second controller for storage in the second storage device.

13. A computer useable medium for storing data for access by a first controller, including a data transfer request data structure comprising information on data movement paths from a first storage device to the first controller, from the first controller to a second controller and from the second controller to a second storage device and information indicating data sets to transfer, wherein the data transfer request data structure further includes an extent data structure of storage areas in the first storage device to backup in storage areas in the second storage device, wherein the first controller sequentially processes the data sets indicated in the extent, wherein the first controller sequentially controls the transfer of data sets included in the extent data structure from the storage areas in the first storage device to the storage areas in the second storage device to backup the data in the second storage device, wherein a host system generates the data transfer request data structure and defines the data movement paths to not pass through the host system, wherein the host system communicates the data transfer request data structure to the first controller, and wherein the first controller processes the data transfer request data structure to control the transfer of data sets from the first storage device via the data movement paths indicated in the data transfer request data structure to the second controller for storage in the second storage device.

14. A system for transferring data, comprising:
   a host system;
   first and second controllers;
   a communication line providing data communication between the host system and the first controller;
   a first storage device;
   a second storage device, wherein the first and second controllers are in data communication with the first and second storage devices;
   means, performed by the host system, for allocating source and target locations, wherein data is transferred from the source location in the first storage device to the target location in the second storage device;
   means, performed by the host system, for maintaining serialization of the source location;
   means, performed by the host system, for defining data movement paths from the first storage device to the first controller, from the first controller to the second controller, and from the second controller to the second storage device;
   means, performed by the host system, for defining a data transfer request to include information on the data movement paths, source and target locations, and data sets to transfer therebetween, wherein the data transfer request defined by the host system includes an extent data structure of storage areas in the first storage device to backup in storage areas in the second storage device, wherein the step of processing comprises the first controller sequentially processing the data sets indicated in the extent, and wherein the step of transferring the data sets comprises the first controller sequentially transferring data sets from the first set of storage areas in the first storage device to the second controller to backup the data from the first storage device in the second storage device;
   means, performed by the communication line, for transferring the data transfer request, including the information on the data sets to transfer to the first controller;
   means, performed by the first controller, for processing the information on the data sets to transfer; and
   means, performed by the first controller, for transferring the data sets from the source location in the first storage device to a second controller, wherein the second controller transfers the data sets to the target location in the second storage device, wherein data movement paths between the first and second controllers through which the data sets are transferred do not pass through the host system.

* * * * *

UNITED STATES PATENT AND TRADEMARK OFFICE
CERTIFICATE OF CORRECTION

PATENT NO. : 6,393,537 B1  
DATED : May 21, 2002  
INVENTOR(S) : Robert Frederic Kern et al.

It is certified that error appears in the above-identified patent and that said Letters Patent is hereby corrected as shown below:

Column 3,  
Line 40, delete "compute" and insert -- computer --

Column 4,  
Line 62, delete "34" and insert -- 34a --  
Line 63, delete "36" and insert -- 36a,b --  
Line 64, delete "34" and insert -- 34a,b --  
Line 64, delete "38" and insert -- 36a,b --

Column 5,  
Line 5, delete "controller 34" and insert -- controllers 34a,b --  
Line 5, delete "44" and insert -- 42 and 44, respectively --  
Lines 7 and 10, delete "controller 34" and insert -- controllers 34a,b --  
Lines 36, 51, 54, 62 and 65, delete "36" and insert -- 36a,b --  
Line 64, delete "34" and insert -- 34a,b --

Column 6,  
Line 1, delete "34" and insert -- 36a,b --  
Line 5, delete "36" and insert -- 36a,b --  
Lines 6, 9, 13, 43, 45 and 55, delete "36" and insert -- 36a,b --

Column 7,  
Line 55, delete "3" and insert -- 13 --

Signed and Sealed this

Fifth Day of August, 2003

JAMES E. ROGAN  
*Director of the United States Patent and Trademark Office*

UNITED STATES PATENT AND TRADEMARK OFFICE
CERTIFICATE OF CORRECTION

PATENT NO. : 6,393,537 B1
DATED : May 21, 2002
INVENTOR(S) : Robert Frederic Kern et al.

It is certified that error appears in the above-identified patent and that said Letters Patent is hereby corrected as shown below:

Column 3,
Line 40, delete "compute" and insert -- computer --

Column 4,
Line 62, delete "34" and insert -- 34a --
Line 63, delete "36" and insert -- 36a,b --
Line 64, delete "34" and insert -- 34a,b --
Line 64, delete "38" and insert -- 36a,b --

Column 5,
Line 5, delete "controller 34" and insert -- controllers 34a,b --
Line 5, delete "44" and insert -- 42 and 44, respectively --
Lines 7 and 10, delete "controller 34" and insert -- controllers 34a,b --
Lines 36, 51, 54, 62 and 65, delete "36" and insert -- 36a,b --
Line 64, delete "34" and insert -- 34a,b --

Column 6,
Line 1, delete "34" and insert -- 36a,b --
Line 5, delete "34" and insert -- 34a,b --
Lines 6, 9, 13, 43, 45 and 55, delete "36" and insert -- 36a,b --

Column 7,
Line 55, delete "3" and insert -- 13 --

This certificate supersedes Certificate of Correction issued August 5, 2003.

Signed and Sealed this

Twenty-fifth Day of November, 2003

JAMES E. ROGAN
*Director of the United States Patent and Trademark Office*